United States Patent [19]

Jones et al.

[11] 4,384,940
[45] May 24, 1983

[54] CHLORINE LEACHING OF NICKEL-COBALT-IRON SULPHIDES

[75] Inventors: David L. Jones, Houston, Canada; Kohur N. Subramanian, Houston, Tex.

[73] Assignee: Inco Limited, Toronto, Canada

[21] Appl. No.: 341,447

[22] Filed: Jan. 21, 1982

[51] Int. Cl.³ .............................................. C25C 1/08
[52] U.S. Cl. .............................. 204/113; 75/101 R; 75/112; 75/114; 75/119; 75/121
[58] Field of Search ............. 204/112, 113; 75/101 R, 75/112-114, 119, 121

[56] References Cited

U.S. PATENT DOCUMENTS

| | | | |
|---|---|---|---|
| 1,943,337 | 1/1934 | Mitchell | 423/103 |
| 3,839,168 | 10/1974 | Gandon et al. | 204/113 |
| 3,871,978 | 3/1975 | Gandon et al. | 204/113 |
| 3,880,653 | 4/1975 | Hougen | 75/101 R |
| 3,901,775 | 8/1975 | Kane et al. | 204/105 M |
| 3,981,962 | 9/1976 | Smyres et al. | 423/35 |
| 4,004,990 | 1/1977 | Suetsuna et al. | 204/113 |
| 4,113,471 | 9/1978 | Langhorst et al. | 204/113 |
| 4,173,520 | 11/1979 | Demarthe et al. | 204/113 |
| 4,236,981 | 12/1980 | Demarthe et al. | 204/113 |

FOREIGN PATENT DOCUMENTS 3297 5/1974 South Africa .
1456065 11/1976 United Kingdom .

OTHER PUBLICATIONS

B. J. Scheiner et al, "Lead-Zinc Extraction From Flotation Concentrates by Chlorine-Oxygen Leaching", SME Fall Mtg., Salt Lake City, Sep. 1975, Preprint No. 75-B-314, pp. 1-13.
Chem. Abst., vol. 86, 45882f (1977).

Primary Examiner—R. L. Andrews
Attorney, Agent, or Firm—Raymond J. Kenny; Ewan C. MacQueen

[57] ABSTRACT

Metal values are recovered from mattes containing nickel, cobalt and iron by first suspending the mattes in water, oxygen pressure leaching and then chlorine leaching the residue from the oxygen leach.

9 Claims, 1 Drawing Figure

FLOWSHEET FOR TREATING Ni-Co-Fe MATTES

FLOWSHEET FOR TREATING Ni-Co-Fe MATTES

CHLORINE LEACHING OF NICKEL-COBALT-IRON SULPHIDES

The present invention is directed to the treatment of mattes containing nickel, cobalt and iron to recover the valuable metals and to discard the iron.

BACKGROUND OF THE INVENTION AND THE PRIOR ART

It is considered that nickel mattes rich in cobalt will be available from a number of sources, such as, for example, the recovery of metal values from sea nodules, treatment of slags to reclaim metal values from waste products generated in the nickel smelter and various residues arising in the treatment of nickel containing materials.

It is to be appreciated that in the normal operation of the nickel converter wherein iron elimination is desired, that a large proportion of cobalt present in the nickel matte will be oxidized along with the iron. Accordingly, it is to be expected that nickel mattes rich in cobalt will also contain considerable quantities of iron. This factor presents difficulties in terms of potential reagent costs particularly when chlorine leaching is to be employed.

In the case of nickel mattes, which are usually poor in cobalt and iron, chlorine leaching has been demonstrated to have a number of advantages. In particular, the production of chloride solutions provides the means for ready separation of cobalt from nickel based on solvent extraction of the cobaltous chloride complex. Cobalt and nickel electrowinning may readily be conducted from all chloride electrolytes. In applying chlorine leaching to mixed nickel-cobalt mattes containing substantial iron contents, the iron will be converted to ferric chloride during the leaching representing a substantial loss of chlorine. This can only be replaced by hydrolysis of the ferric ions. When large amounts of iron are present, this approach is not practical from the viewpoint of reagent cost.

The leaching of mattes, ores and concentrates with chlorine or oxygen is an established practice is hydrometallurgy. In addition, simultaneous use of chlorine with chloride solutions containing copper is known. Recently, as shown in South Africa Pat. No. 74/3297, replacement of chlorine by oxygen and HCl has been suggested. Methods of removing and recycling copper in solution when leaching nickel matte have been shown in U.S. Pat. No. 3,880,653. The combination of chlorine and ferric chloride solutions has been proposed for leaching nickel matte in U.S. Pat. No. 1,943,337. A method for recycling ferric ions by means of solvent extraction has been suggested in U.S. Pat. No. 4,173,520. The use of both chlorine and oxygen as reagents in a leaching scheme for sulfides has been suggested in U.S. Pat. No. 3,981,962 and has been described in a paper entitled, "Lead-Zinc Extraction from Flotation Concentrates by Chlorine-Oxygen Leaching" at the SME Fall meeting, Salt Lake City, September 1975, preprint No. 75-B-B14 by Scheiner, Smyres and Lindstrom. In accordance with the teachings of these disclosures, oxygen is added simultaneously with or subsequent to chlorine.

SUMMARY OF THE INVENTION

Nickel-cobalt-iron mattes are leached by a process in which the particulate matte in aqueous suspension is first leached with oxygen under pressure and the residue from the oxygen leach is then subjected to chlorine leaching. The products of the process include a solution containing the cobalt and nickel chlorides, a sulfur residue and an iron oxide-hydroxide cake.

DESCRIPTION OF THE DRAWING

The accompanying

DETAILED DESCRIPTION OF THE INVENTION

Figure 1:
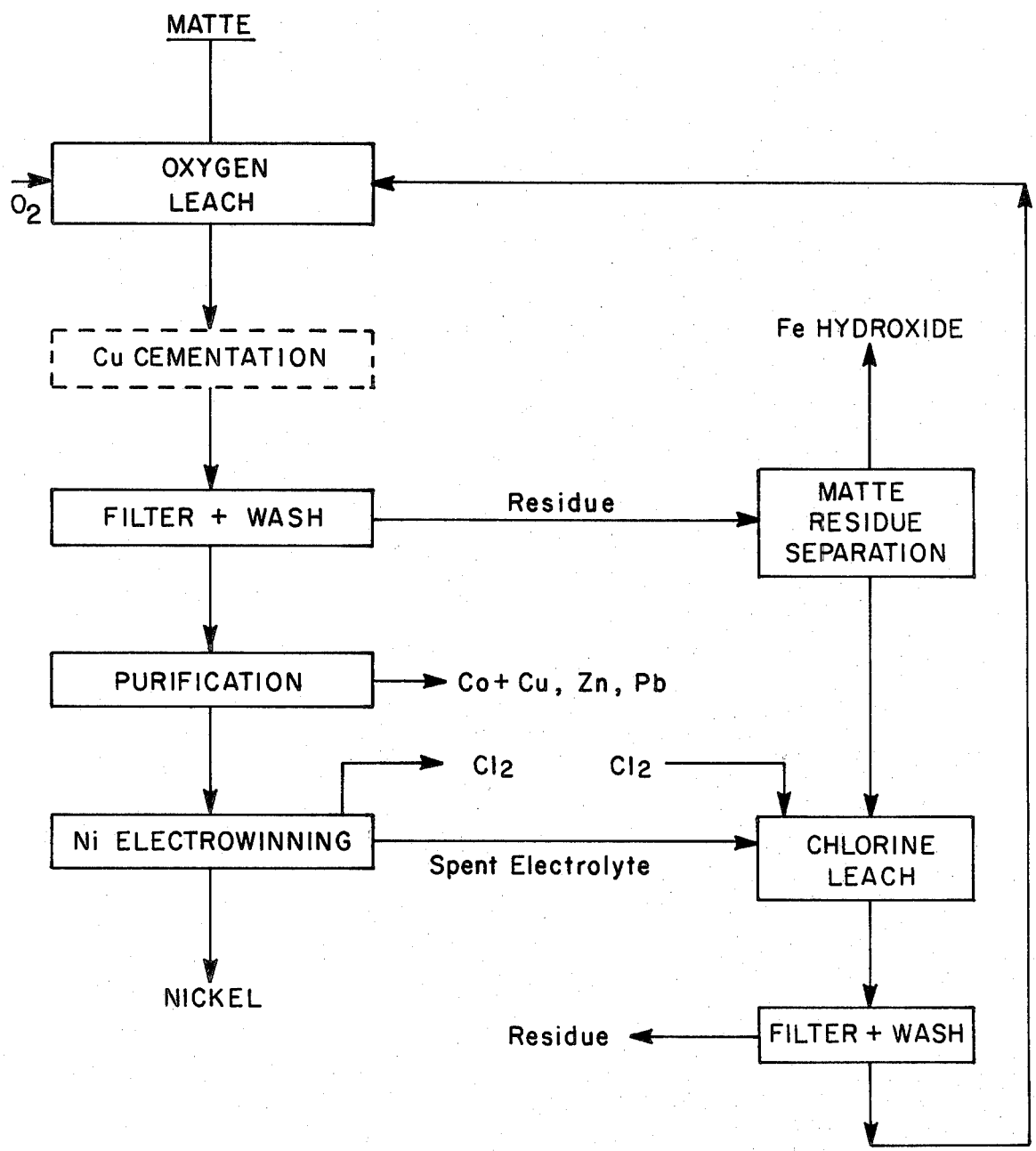
FIG. 1 depicts a flowsheet for treating nickel-cobalt-iron mattes wherein the matte is first oxygen leached and is then chlorine leached and wherein the solid materials move countercurrent to the solution between the leaching stages.

In accordance with the invention metal values are recovered from mattes containing nickel, cobalt and iron, by first leaching the feed matte in aqueous suspension under pressurized oxygen and then chlorine leaching the matte residue from the oxygen leach. The oxygen leach is conducted in an acid chloride aqueous solution high in solubilized iron. This step solubilizes at least a portion of the base metal content of the matte and hydrolyzes iron in solution. The partially oxygen leached matte may then be agitated with the leach solution to cement copper thereon. Thereafter, the oxygen leached products are subjected to solid-liquid separation and the solids are reverted to the chlorine leaching step while the pregnant oxygen-leach liquor is purified, treated to remove cobalt, and then subjected to nickel electrowinning. The spent liquor from electrowinning is reverted to the chlorine leach step.

In the chlorine leach step, the remaining metal values are dissolved and elemental sulfur is obtained. The leach products from the chlorine leach are subjected to solid-liquid separation to remove the elemental sulfur and the liquor is cycled to the oxygen leach.

The solid material from the oxygen leach comprising a mixed residue of partially leached and cemented matte with iron hydroxides may be treated to separate and reject the iron hydroxides.

Mattes to be treated in accordance with the present invention may contain, in weight percent, about 10 to about 40% nickel, about 1 to about 20% cobalt, about 20 to about 70% iron, up to about 20% copper and about 5 to about 30% sulfur. The sulfur content will usually be sufficient to sulfidize the iron and cobalt contents stoichiometrically.

Reference to the accompanying FIG. 1 of drawing will make the invention more readily comprehensible. As shown in the drawing, the feed matte is first leached with oxygen in an intermediate high iron liquor coming from the chlorine leach. This step simultaneously leaches part of the base metals in the matte and hydrolyzes the iron in solution. Following this, the oxygen leach slurry may be immediately filtered yielding a comparatively iron-free solution containing a major proportion of the copper in addition to cobalt and nickel. Copper may be separated from this solution by, for example, precipitation as sulfide. Alternately, the oxygen in the leach reactor atmosphere is released and the slurry of hydrolyzed iron and partially leached matte stirred for a further period during which soluble copper is cemented onto the partially leached matte yielding a comparatively copper- and iron-free solution. Cobalt can be extracted from the copper- and iron-free solution by solvent extraction or ion exchange, then nickel can be recovered by electrowinning.

The oxygen leach residue comprises a mixture of iron hydroxides and partially leached matte. These components can be separated by flotation or, if the matte particles are large enough, by screening, elutriation, or hydrocloning. If the matte residue contains a substantial proportion of cemented copper, it is desirable to remove a portion of the matte residue for separate copper recovery.

The matte residue is then further leached in spent electrowinning electrolyte with chlorine, to produce a high sulfur residue and an intermediate liquor which is cycled to the oxygen leach. In preparation for the oxygen leach, the matte feed will usually be granulated or ground to provide a particle size of less than about 8 mesh. The liquor fed to the oxygen leach will contain about 100 to about 180 grams per liter (gpl) of nickel, about 1 to about 50 gpl of cobalt, up to about 50 gpl of copper, and about 25 to about 150 gpl of iron as chlorides with up to 10 gpl sulfate.

Oxygen leaching is conducted at a temperature in the range of about 60° to about 105° C., at a pressure of about atmospheric to about 400 lbs/in$^2$. The pH during oxygen leaching will be about $-1$ to about 3. Conditions leading to sulfate formation are avoided.

The liquor fed to the chlorine leach will be essentially devoid of cobalt, copper and iron and may contain about 60 to about 100 gpl of nickel. Chlorine is employed in the leach at a rate of about 0.1 to about 0.8 kilograms of chlorine per kilogram of oxygen leach residue feed to the leach. Chlorine leaching is conducted in the pH range of about 1 to about $-1$, and may be conducted at ambient temperature and pressure.

The sequential leaching steps involving first oxygen leaching and then chlorine leaching, in accordance with the present invention, provide a process having a large measure of self-regulation. Accordingly, close control of the quantity of chlorine added during leaching based on matte assay, is not required. Only sufficient chlorine to combine with the nickel and cobalt contents of the matte being leached is consumed and any excess consumption is readily indicated. The reason for this is that since the matte is first treated with oxygen and then with chlorine, the excess chlorine consumption can only occur through chlorine losses in the off-gas or by sulfur oxidation. Both of these conditions are readily detectable, and can be prevented.

Some examples will now be given.

EXAMPLE 1

Feed for the described tests was a high cobalt matte corresponding to that expected from back reduction of slag from a nickel converter:

|  | Ni | Cu | Fe | Co | S |
|---|---|---|---|---|---|
| (wt. %) | 30.3 | 0.93 | 30.3 | 11.5 | 25.4 |

240 g of this matte was charged into a 1 liter titanium autoclave together with 0.6 liters of liquor anticipated from stage II (Cl$_2$ leach): (g/l) Ni 130, Fe 50, Co 20, Cu 5. The slurry was preheated to 95° C., with the usual agitation and then O$_2$ (300 psi) admitted. Consumption of O$_2$ was rapid, and the test was terminated after 33 minutes; temperature was maintained at 95° C. throughout. The slurry was removed from the autoclave, and the coarse particles separated by screening (325 mesh screen). The fine particles were removed by filtration, leaving a filtrate which had a Fe content of only 0.1 g/l, and the pH of which had risen from $-0.3$ to 2.0.

|  |  | Ni | Cu | Co | Fe | S |  |
|---|---|---|---|---|---|---|---|
| Feed Solution | (0.6 l) | 130 | 5 | 20 | 50 | — | (g/l) |
| Final Solution | (0.6 l) | 184 | 6 | 37 | 0.1 | — |  |
| Feed Matte | (240 g) | 30.3 | 0.9 | 11.5 | 30.3 | 25.4 | (%) |
| Leached Matte | (165 g) | 21.3 | 1.6 | 9.1 | 25.8 | 31.4 |  |
| Fine ppt | (115 g) | 2.8 | 0.5 | 0.5 | 41.5 | 1.8 |  |

The coarse residue corresponding to the leached matte was then Cl$_2$ leached in a glass reactor at atmospheric pressure with a solution containing 80 Ni, 5 Cu. The progress of this test is shown below:

| Time | pH | Redox | Solution SO$_4$ g/l | % S° Residue |
|---|---|---|---|---|
| 0 | 0.5 | 380 | — | — |
| 15 | 0.7 | 310 | — | — |
| 30 | 0.0 | 350 | 3.0 | — |
| 45 | $-0.3$ | 350 | 3.9 | — |
| 120 | $-1.0$ | 570 | 7.2 | 63 |
| 135 | $-1.0$ | 650 | 14.0 | — |
| 150 | $-1.0$ | 720 | 21.0 | 73 |

|  | Ni | Cu | Co | Fe | S |  |
|---|---|---|---|---|---|---|
| Final Residue (wt %) | 4.0 | 1.3 | 2.5 | 5.3 | 79 | (12 g) |

The assay of this final residue corresponds to 97% Ni extraction (and 95% Co extraction). The improvement in residue after 120 minutes is marginal, and the optimum end point would probably come at this time or before.

This test demonstrates the possibility of producing residues (S° and Fe cake) low in Ni, whilst generating low Fe pregnant solutions.

EXAMPLE 2

A second batch of 240 g matte was leached in the same manner as before with 300 psi O$_2$ at 95° C. The 0.6 l solution used as that produced by the Cl$_2$ leach of Example 1, in accordance with FIG. 1. In this test, the O$_2$ addition was terminated at 60 minutes and the O$_2$ atmosphere released, without cooling down the slurry which was stirred for an additional 15 minutes. The purpose of this period was to allow the Cu in solution to cement out on the partially leached matte.

At the end of the oxidation period, the solution assayed (g/l) Cu 5.0, Fe 3.6. At the conclusion of the test (15 minutes later) the solution assay was: Cu 0.2, Fe 5.0.

The residues were again separated by screening (325 mesh) to produce a matte residue and Fe cake:

|  | Ni | Cu | Co | Fe |  |
|---|---|---|---|---|---|
| Matte Residue | 20.6 | 3.32 | 9.02 | 21.0 | 155 g |
| Fe Cake | 1.29 | 0.16 | 0.40 | 50.5 | 119 g |

The loss of cobalt and nickel to the iron cake was approximately 2% of feed. The final filtrate assayed (g/l) Ni 180, Co 36, Fe 5, Cu 0.2.

The advantages of the invention, especially in terms of ease of control, are emphasized by comparison to a scheme whereby a similar material is treated first by chlorine leaching and then (or simultaneously) by oxygen leaching. In such a case, there is no means of detecting excess chlorine addition and chlorine may be added in amount sufficient to dissolve all the metals including iron. Recourse to calculated additions of chlorine based on feed assay would rarely be satisfactory. Any FeCl$_3$ formed in the leaching represents a loss of chlorine, which can only be replaced by hydrolysis of ferric ions, an impractical process where large amounts of ferric chloride is present. The present invention permits utilization of the matte itself as base and iron is hydrolyzed in oxygen leaching. The invention also provides automatic correction in that the amount of feed dissolved in oxygen leaching is a function of the iron content of the chlorine leach spent solution reverted thereto; whereas the more feed dissolved in oxygen leaching, the less iron will be available when the residue therefrom is chlorine leached.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for recovering metal values from mattes containing the base metals nickel, cobalt and iron comprising the steps of first leaching an aqueous slurry of feed matte under pressurized oxygen in an acid chloride aqueous solution high in iron to solubilize at least a portion of the base metal content of said matte and to hydrolyze iron, subjecting the oxygen leach products to solid-liquid separation to provide a pregnant liquor containing dissolved nickel and cobalt and a solid residue, chlorine leaching said solid oxygen leach residue in an aqueous acid liquor to produce a high sulfur residue and an intermediate liquor, cycling said intermediate liquor to said oxygen leach, treating the pregnant oxygen-leach liquor to remove cobalt and then electrowinning nickel therefrom, and cycling spent electrolyte from said nickel electrowinning to said chlorine leaching step.

2. A process in accordance with claim 1 wherein the solids from the oxygen leach are treated to separate matte residues from iron hydroxides and the iron hydroxides are discarded.

3. A process in accordance with claim 1 wherein the matte feed contains about 10% to about 40% nickel, about 1% to about 20% cobalt, about 20% to about 70% iron, up to about 20% copper and about 5% to about 30% sulfur.

4. A process in accordance with claim 1 wherein the liquor fed to the oxygen leach contains, in grams per liter, about 100 to about 180 of nickel, about 1 to about 50 of cobalt, up to about 50 of copper, and about 25 to about 150 of iron as chlorides, with up to about 10 of sulfate.

5. A process in accordance with claim 1 wherein oxygen leaching is conducted at about 60° to about 105° C., at an oxygen pressure of up to about 400 psi and a pH of about −1 to about 3.

6. A process in accordance with claim 1 wherein the liquor fed to the chlorine leach contains about 60 to about 100 gpl of nickel as chloride and is essentially devoid of cobalt, copper and iron.

7. A process in accordance with claim 1 wherein the liquor from oxygen leaching is treated to remove cobalt.

8. A process in accordance with claim 1 wherein chlorine leaching is conducted at a pH in the range of about 1 to about −1.

9. A process in accordance with claim 1 wherein chlorine is fed to the chlorine leach in amount to dissolve essentially all of the metals in the oxygen leach residue fed to chlorine leaching.

* * * * *